United States Patent
Engler et al.

(10) Patent No.: US 7,525,065 B2
(45) Date of Patent: Apr. 28, 2009

(54) LASER-ASSISTED COATING REMOVAL METHOD

(75) Inventors: Harald Engler, Delmenhorst (DE); Lothar-Bernhard Hoenemann, Bremen (DE); Tillmann Doerr, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/130,677

(22) Filed: May 17, 2005

(65) Prior Publication Data
US 2006/0000813 A1  Jan. 5, 2006

Related U.S. Application Data

(60) Provisional application No. 60/600,063, filed on Aug. 9, 2004.

(30) Foreign Application Priority Data

May 18, 2004  (DE)  .................. 10 2004 025 017
Feb. 3, 2005  (EP)  ....................... 05002293

(51) Int. Cl.
  B23K 26/36  (2006.01)
(52) U.S. Cl. .................................. 219/121.69
(58) Field of Classification Search ............ 219/121.68, 219/121.69; 439/109
  See application file for complete search history.

(56) References Cited

U.S. PATENT DOCUMENTS

| 3,922,050 | A | * | 11/1975 | Lettini et al. ............ 439/109 |
| 4,518,232 | A | * | 5/1985 | Dagenais ............ 219/121.74 |
| 4,906,211 | A | * | 3/1990 | Bell et al. ............ 439/851 |
| 4,931,616 | A | * | 6/1990 | Usui et al. ............ 219/121.68 |
| 4,986,664 | A | * | 1/1991 | Lovoi ............ 219/121.68 |
| 5,151,134 | A | * | 9/1992 | Boquillon et al. ............ 219/121.76 |
| 5,418,349 | A | * | 5/1995 | Swain et al. ............ 219/121.84 |
| 5,439,642 | A | * | 8/1995 | Hagmann et al. ............ 422/22 |
| 5,643,476 | A | * | 7/1997 | Garmire et al. ............ 219/121.68 |
| 5,662,762 | A |   | 9/1997 | Ranalli |
| 5,736,709 | A | * | 4/1998 | Neiheisel ............ 219/121.68 |
| 5,780,806 | A | * | 7/1998 | Ferguson et al. ............ 219/121.68 |

(Continued)

FOREIGN PATENT DOCUMENTS

DE  4413158 A1 * 10/1995

(Continued)

OTHER PUBLICATIONS

Bianco, M. et al.: "Laser stripping of paints for Aircrafts: A comparison between traditional and TEA superpulsed CO2 lasers", Surfair XI, Cannes (1996), pp. 1-8.

(Continued)

*Primary Examiner*—Geoffrey S Evans
(74) *Attorney, Agent, or Firm*—Christopher Paradies; Fowler White Boggs P.A.

(57) ABSTRACT

Stripping is accomplished with a pulsed laser beam that targets the material and area to be stripped. The wavelength laser beam may be selected or adjusted to the absorption behavior of the material to be stripped without damaging the underlying base material. A control unit may operably adjust an optical system to guide the laser beam over the surface to be treated. a coating. This makes it possible to improve the surface stripping process.

11 Claims, 4 Drawing Sheets

U.S. PATENT DOCUMENTS

| | | | | |
|---|---|---|---|---|
| 5,986,234 | A | * | 11/1999 | Matthews et al. ...... 219/121.68 |
| 5,998,759 | A | * | 12/1999 | Smart ................... 219/121.69 |
| 6,144,010 | A | * | 11/2000 | Tsunemi et al. ........ 219/121.68 |
| 6,239,376 | B1 | * | 5/2001 | Kimura et al. .......... 174/110 R |
| 6,849,822 | B2 | * | 2/2005 | Kiessling et al. ....... 219/121.69 |
| 2004/0035498 | A1 | * | 2/2004 | Kinlen ....................... 148/250 |
| 2005/0040150 | A1 | * | 2/2005 | Denney et al. ......... 219/121.84 |
| 2005/0056625 | A1 | * | 3/2005 | Haight et al. .......... 219/121.69 |
| 2005/0150878 | A1 | * | 7/2005 | Thomas et al. ......... 219/121.68 |

FOREIGN PATENT DOCUMENTS

| | | | |
|---|---|---|---|
| DE | 10113494 A1 | | 10/2002 |
| JP | 5-337660 A | * | 12/1993 |
| JP | 10-309517 A | * | 11/1998 |
| JP | 10-309900 A | * | 11/1998 |
| JP | 11-6086 A | * | 1/1999 |
| JP | 2002-331373 A | * | 11/2002 |
| WO | 83/01400 A1 | | 4/1983 |

OTHER PUBLICATIONS

Kelley, J.D.:"Flashjet coatings removal process—transition from development to products", Surfair XI, Cannes (1996).

Schwiezer, G, Werner, L. "Industrial 2kW Tea CO2 laser for paint stripping of aircraft", 10th International Conference on Gas Flow and Chemical Lasers (GCL94), Friedrichshafen, Germany (1994), pp. 57-62.

European Search Report dated Jan. 5, 2007 for application EP 05 00 2293, 5 pages.

* cited by examiner

LASER-ASSISTED COATING REMOVAL METHOD

RELATED APPLICATIONS

This application claims the benefit of Provisional Application No. 60/600,063, filed Aug. 9, 2004, German application 10 2004 025 017.0, filed May 18, 2004 and European Patent application 05 002 293.8, filed Feb. 3, 2005.

FIELD OF THE INVENTION

The present invention relates to the removal of coatings from surfaces. In particular, the present invention relates to a method for removing a surface coating on a surface by means of a laser, as well as to a cleaning device and a corresponding use.

TECHNOLOGICAL BACKGROUND

Airplanes are constructed in such a way that electrostatic charges do not cause electrical systems to become damaged or malfunction. In like manner, electrostatic charges must not produce any damage to structures comprising the aircraft framework components or aircraft skin. A good electrical conductivity of the structure and equipment parts dissipates electrical charges and establishes a good electrical ground connection for the electrical system. All electrically conductive parts, e.g., the aircraft fuselage, wings, empennages, flaps, landing gear, power plant cladding, etc., must be provided with chassis terminal surfaces.

During the application of surface protection on the electrically conductive parts, the areas of the surface provided for assembly of the chassis ground are protected with aluminum foil against the application of the surface protection. After the surface protection has been applied, the protective film is removed, and the chassis terminal is fabricated after cleaning the substrate by means of a terminal shoe and connecting cable. A direct contact must be established between the terminal shoe and the conductive surface. If an electrically non-conductive layer, e.g., anodization or paint, gets under the protective film while applying the surface protection, remediation removes the layer after the fact with a rapidly rotating brush or grinding wheel. However, remediation is time-consuming, man power intensive and inefficient. In addition to the high cost involved, remediation reduces the quality, i.e., the quantity of material removed, and in a poor surface quality (roughness), which detracts from electrical conductivity and/or increases potential for corrosion.

SUMMARY OF THE INVENTION

A method for removing a layer of non-conductive or poorly conductive material in an area of a surface uses a laser beam. The laser beam is positioned and aligned on the area to be cleaned and pulsing of the laser beam ablates the layer.

The laser may advantageously be used only on the area to be stripped. The coherency properties of the laser and the essentially parallel beam progression of the laser beam may make it possible to traverse an area on the surface with a high level of precision. As a result of the pulsating operation of the laser, exposure to laser energy can be kept brief, and it is believed that no undesired temperature change of the basic material is brought about. This brief time can be sufficient to evaporate the surface coating without excessively heating the underlying carrier material in the process. Negative effects caused by exposure of the carrier material to heat may thereby be avoided or minimized.

In an exemplary embodiment of this invention, the wavelength of the laser beam can be adjusted in accordance with an absorption behavior of the surface coating.

Adjusting the wavelength to the absorption behavior of the surface coating may advantageously makes it possible to enhance the effect of the laser beam on the surface coating, and make use of the reflecting property of the metallic basic material. Material can only absorb energy corresponding to a specific wavelength. Since the energy transmitted by a laser beam depends on the wavelength, adjusting this wavelength to the absorption behavior of a material may make it possible to confine the effect to the material to be stripped. This means that the material of the surface coating absorbs the energy introduced via the laser, while the basic material reflects the laser beam, and so has only a very slight degree of absorption.

In other exemplary embodiments of the present invention, a method is specified in which an Nd:YAG laser or a TEA $CO_2$ laser are used. An Nd:YAG laser or TEA $CO_2$ laser have wavelengths that may work well with a surface coating often encountered in aircraft construction.

In another exemplary embodiment of the present invention, the method further involves the step of evaporating the surface coating. Evaporation allows the surface coating to separate from the surface to which it adheres, and dissolve in the ambient air, thereby stripping the surface. Since the contaminants are dissolved in the atmosphere, they can be easily trapped, e.g., through extraction.

In another exemplary embodiment of the present invention the evaporated surface coating is extracted or further cleaned by suction cleaning. Extracting the evaporated surface coating may allow for a better purification of the ambient air while processing the parts. For example, this may make it possible to better comply with workplace health regulations.

In another exemplary embodiment of the present invention, the method can be used for manufacturing chassis terminal surfaces on aircraft components. Since chassis grounds are most often achieved via the direct contacting of two metals, and the contact properties improve as contaminants between them are diminished, and the directly contacting surface of the chassis terminal increases, it may be advantageous to have completely stripped metal surfaces with low surface roughness on hand.

In another exemplary embodiment of the present invention, the method is applied to an aluminum alloy surface. The aluminum alloy is believed to not be adversely affected during this laser treatment.

In another exemplary embodiment of this invention, the method is applied for removing a surface coating. The surface coating can be an anodizing layer, a primer layer or a topcoat layer, or any laminate consisting of these layers. An anodizing layer or anodization layer can be formed on the basis of chromic acid or sulfuric acid. A primer layer can be a resin-based coating. A topcoat color layer is mostly based on a polyurethane, epoxide or powder lacquer.

It is preferred that the coating to be removed selectively has a high degree of absorption for the wavelength of the laser. In other words, the coating absorbs much of the energy from the laser beam, as a result which the material of the coating to be removed separates from the surface to be cleaned.

According to another exemplary embodiment of the present invention, a device for removing a surface coating in an area of a surface is provided. The device here comprises a laser, laser beam optical system, and a laser beam controller. The laser generates a laser beam, which the laser beam optical system guides over the component surface in a specific geometric way. The controller or control unit is configured to move the laser beam over the area to be stripped.

This device may be used to provide a laser beam, and the laser beam can be guided to the area to be stripped.

In another exemplary embodiment of the present invention, the device further comprises a fiber coupling. The fiber coupling is adapted for mobile operations. A glass fiber connected with the laser can transport the laser beam generated by the laser to the surface to be treated. Thus, the device can be used in locations where stationary devices cannot be used, or would increase the treatment outlay by way of additional assembly and disassembly measures. The fiber coupling also may facilitate the precise positioning of the laser beam on the area to be cleaned.

The laser may be adapted for generating a laser beam with a power ranging from 50 W to 4 kW, in particular with a power ranging from 100 W to 4 kW, and further in particular with a power ranging from 120 W to 4 kW. As a result, the laser economizes on power, making it efficient to use. The device may further comprise a wavelength adjuster 27, which allows the wavelength to be tuned to the material to be removed. By adjusting the wavelength to the absorption behavior of a surface coating, the coating selectively absorbs the energy conveyed by the laser beam in the area covered by the laser and is removed from the surface. As a result, non-conductive coatings may be remediated in an advantageous manner, such as by evaporation, separation or conversion to a conductive material.

A surface coating removing system may be used to strip chassis terminal surfaces of an aircraft component.

SHORT DESCRIPTION OF THE DRAWINGS

Exemplary embodiments of this invention will be described in detail below, drawing reference to the following figures, which should not be used to limit the scope of the claims that issue. Instead, the claims should only be limited by the language of the claims, themselves.

DETAILED DESCRIPTION OF EXEMPLARY EMBODIMENTS OF THE PRESENT INVENTION

Figure 1:
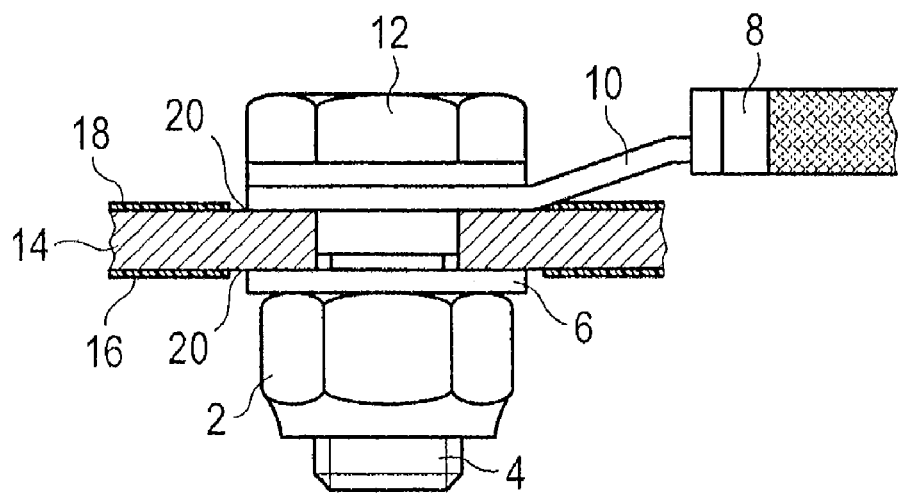
FIG. 1 shows a diagrammatic sketch of a chassis terminal surface connected with an electrical cable.

FIG. 1 is a diagrammatic sketch of a chassis terminal surface connected with an electrical cable. The figure shows a conductive basic material 14, which can be plated or unplated. Structural elements comprised of a conductive basic material 14, e.g., an aluminum alloy like Al 2024, are often used in aircraft construction. A non-conductive surface protection system 18 is applied to this conductive basic material 14. This non-conductive surface protection system 18 protects the basic material 14 against outside influences, e.g., in order to impede corrosion. The non-conductive surface protection system 18 can be composed of an anodized layer based on chromic acid or sulfuric acid, of primer and topcoat paint, wherein it is not necessary that all layers be used at the same time, or any other system known in the art.

FIG. 1 shows an example for the chassis terminal of part of an airplane. The conductive surface 20 of the part is connected by a connecting cable 8 and terminal shoe 10 with other parts of the airplane. To this end, the basic material, most often a metal sheet, has a hole into which a screw 4 is placed. A screw head 12 and nut 2 are used to press the terminal shoe 10 and a shim 6 against the surface of the basic material 14. Since the best possible contact surface is critical when connecting the terminal shoe 10 and shim 6 with the conductive surface 20 of the basic material, the area in which the terminal shoe 10 and shim 6 contact the conductive surface 20 must be as free of non-conductive materials as possible.

Non-conductive materials can include the surface protection system 18 and contaminants. During the application of the surface protection system 18, the area in which the terminal shoe 10 is to contact the conductive surface 20 of the basic material 14 is ordinarily covered in the conventional stripping process to protect it against the unintentional application of the surface protection system 18. However, constituents of the surface protection system 18 still get into the area where the terminal shoe 10 rests on the conductive surface 20. Therefore, this area is inspected and cleaned to remove contaminants before applying the screw 4. Cleaning is intended to expose the bare surface 20, which essentially may be a mirror-reflecting metal surface. This is why the stripping process may also be referred to as a mirroring process.

Figure 2:
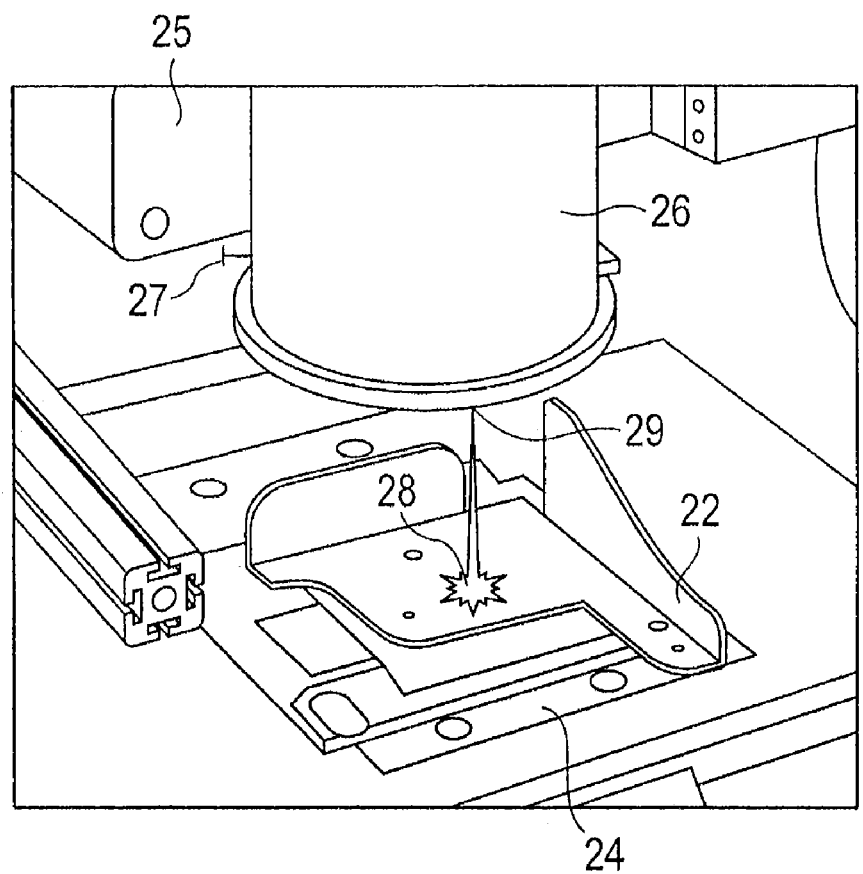
FIG. 2 shows a three-dimensional representation of a device for cleaning chassis terminal surfaces according to this invention.

FIG. 2 shows a three-dimensional representation of a device for stripping chassis terminal surfaces. The figure shows an arrangement of a laser 26 on a controller 25 (or control unit). The laser 26 can be a TEA $CO_2$-laser or an ND:YAG (neodym:yttrium aluminum granate) laser, for example. When using an Nd:YAG laser, it is possible to influence the range of action of the laser 28 with a fiber coupling. The fiber coupling involves connecting an optical fiber to the laser 26, so that the laser beam 28 can be routed to the location to be treated via the optical waveguide.

A component 22 to be treated is positioned on a workpiece carrier 24 under the laser 26. The laser 26 is connected to the controller 25, so that it can be horizontally moved over the component 22. For example, the laser can be made to traverse the area to be stripped by the controller 25, e.g., controlled by a program In addition, it is possible to guide the laser beam via controlled mirrors to the application area. In another embodiment, the laser is integrated in a handheld system for mobile use by a technician. In the embodiment, a continuous LED laser beam may be used to target a pulsed laser beam that is used to remove the unwanted material from the contact surface. In this manner, a technician may easily target the area to be treated.

While the laser 26 traverses the area to be treated, it may generate a pulsed laser beam 28. The wavelength of the laser beam 28 is selected in such a way as to correspond to the absorption behavior of a coating to be removed from the surface of the component 22. A mirror-controlled lens 29 can be used to additionally adjust the laser beam 28 to the area of the surface coating to be treated. It is also conceivable to use the laser beam 28 for cleaning a component surface.

Once the laser beam 28 hits the surface coating, the absorption behavior of the latter causes it to absorb the energy conveyed by the laser, as a result of which the surface coating may be evaporated and/or otherwise detached from the surface of the component 22. The component 22 may be a conductive material, e.g., an aluminum alloy. The coating to be removed may comprise constituents of a non-conductive surface protection system. Since the laser beam 28 is pulsed, it can be made to act only with the contaminants, without damaging the underlying conductive, and often plated base layer 20. The pulsing and wavelength selected for the beam is capable of limiting or preventing any heating and/or damage to the base layer 20.

The arrangement in FIG. 2 shows a device for treating smaller to medium sized components 22. Given the correspondingly larger dimensions and power level of the laser, the system can also be used for larger components, and the treatment of larger surfaces.

Figure 3:
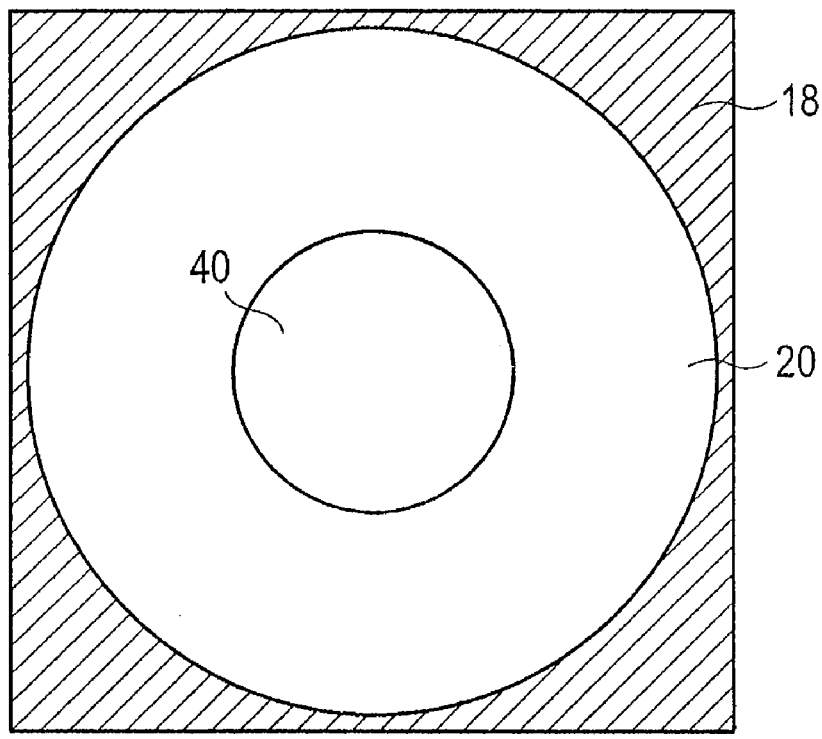
FIG. 3 shows a two-dimensional top view of a chassis terminal surface cleaned according to this invention.

FIG. 3 shows a two-dimensional top view of a chassis terminal surface stripped according to one example of the invention. The image shows a section of a component surface, which provides the attachment of a chassis terminal. Visible is area 18, in which a non-conductive surface protection system, such as an anodizing layer based on chromic acid or sulfuric acid, primer or topcoat paint, is applied to the conductive surface 20. A circular bright surface 20 can be seen around the hole 40, into which the attachment screw 4 (shown in FIG. 1) for the terminal shoe 10 (shown in FIG. 1) is introduced. The surface coating was removed in this area via the laser mirroring technique. As evident, the uniform, smooth surface structure of the conductive surface 20 has not been impaired by the stripping process. As also evident, a very sharp transition takes place between the non-conductive surface protection system 18 and the conductive surface 20. Such a sharp transition is possible because the laser beam can be very precisely positioned in the area to be treated.

Figure 4:
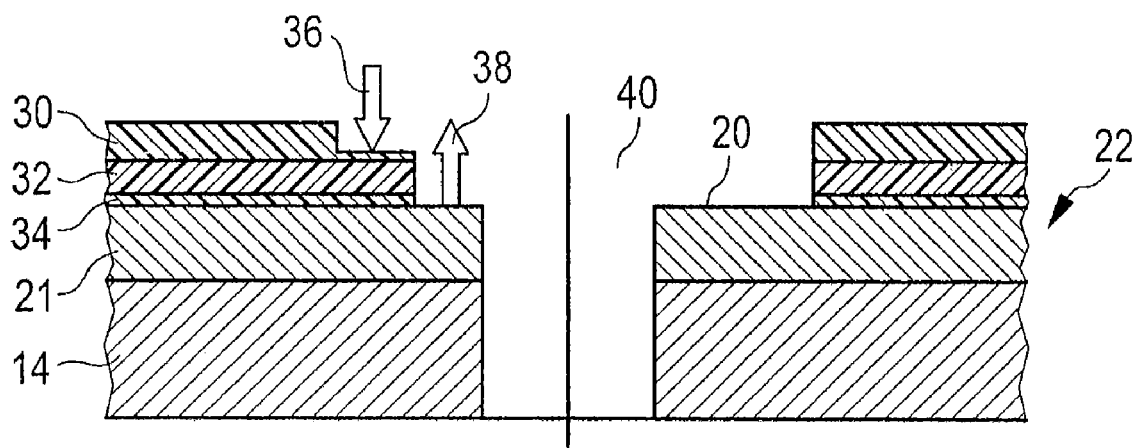
FIG. 4 shows a two-dimensional sectional view through a chassis terminal surface.

FIG. 4 shows a two-dimensional sectional view through a chassis terminal surface. The figure shows the laminar structure of a component 22, e.g., fuselage components of an aircraft. The component 22 consists of a conductive basic material 14, which is covered by a conductive plating 21. A non-conductive surface protection system 18 is applied to the plating 21, e.g., for corrosion protection. This non-conductive surface protection system 18 can in turn consist of several layers. The anodizing layer 34 consisting either of chromic acid (CAA) or sulfuric acid (SAA) is applied directly to the plating 21. The primer 32 is applied to the anodizing layer 34. Finally, the topcoat paint 30 comprises uppermost protective layer of the primer 32.

The surface 20 of the conductive plating 21 may be treated to provide a symmetrically accessible area around the hole 40 free of surface protection layers. The screw 4 is introduced into the hole 40 for securing the terminal shoe 10. Electrically non-conductive surface protection systems 30, 32, 34 in the area to be kept open may be removed. To this end, energy is supplied to the layers by means of a laser beam 36, whose wavelength has been adjusted to the absorption behavior of the layers. Because the wavelength of the laser beam 36 has been adapted to the absorption behavior of the coating, the latter is evaporated and/or detaches from the conductive surface 20 in the area where exposed to the laser beam 36. Reflections 38 of the laser beam 36 on the conductive surface 20 facilitate the detachment process. Therefore, it may be advantageous that the plating 21 or base material consist of a material with a high reflectivity for the wavelength selected for the laser beam, so that only a slight amount of thermal energy is introduced into the base material. Once the conductive surface 20 of the plating layer has been laid bare, good contact can be established between the cable shoe 10 and the conductive surface 20 or basic material 14. The result is good ground dissipation.

Figure 5:
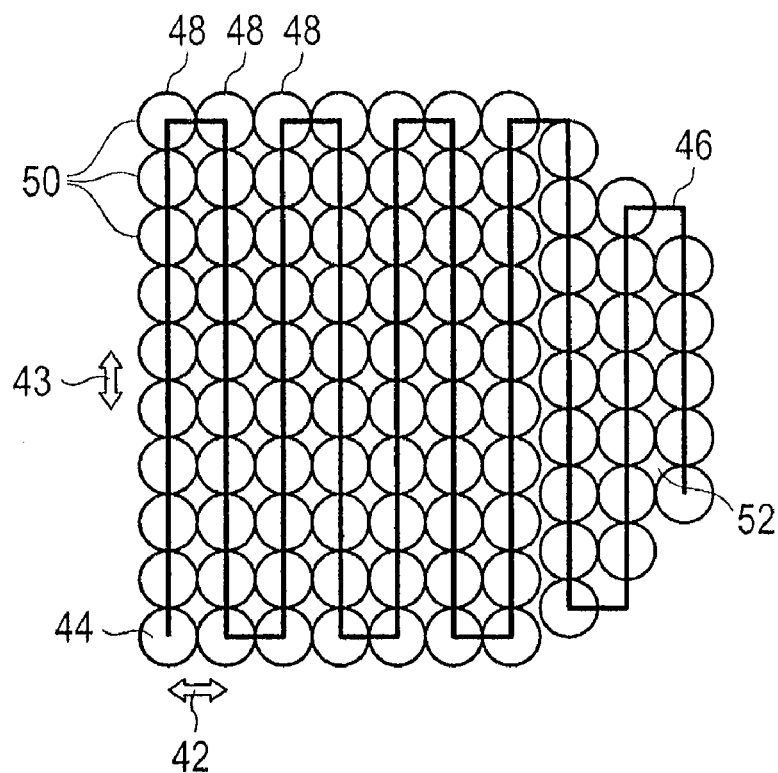
FIG. 5 shows a diagrammatic representation of how the laser is guided to clean a contaminated surface according to an exemplary embodiment of this invention.

FIG. 5 shows a diagrammatic view of how the laser is guided for stripping a surface according to an exemplary embodiment of this invention. A laser beam 28 makes it possible to generate arc spots 44 on a material. The diameter of the arc spots corresponds to the diameter of the laser beam 28, and can be selected to be very small, if desired, since a laser beam 28 is highly parallel and focusable. If this laser beam 28 hits a material with sufficient absorptive capacity for the wavelength of the laser beam 28, the material may be rapidly heated to the size of the arc spot 44. Rapid heating is capable of evaporation of many protecting coatings or may cause detachment or stripping of layers due to rapid thermal expansion. Ablation is the process of removing a surface material by evaporation.

Numerous adjacent arc spots 44 make it possible to duplicate contours of areas. For example, such a contour can be a chassis terminal surface. The left side of FIG. 5 shows how several adjacent arc spots can be used to form corners. By contrast, the right side of FIG. 5 shows how rounded edges can also be formed using this procedure.

In order to ensure that each location of the contour to be cleaned is traversed, the contour is divided into columns 48 and lines 50. The selected width 42 of the columns 48 or height 43 of the cells 50 depends on the desired cleaning intensity. The figure shows a selection of column width 42 and line height 43, so that the arc spots 44 do not come to overlap. This yields areas 52 that are not covered by the laser beam 28. However, the width 42 of the columns 48 and the height 43 of the lines 50 can also be adjusted accordingly, so that the arc spots 44 overlap, and hence the untreated areas 52 are reduced or eliminated.

The track 46 on FIG. 46 shows an example for guiding the laser over the area to be processed. As the laser beam traverses the surface to be processed from a starting point, it first is shifted line by line into a column 48, until the edge of the contour is reached. The beam is then moved to the adjacent column, and again shifted line-by-line up to the contour edge, but in the other direction. This yields a rectangular track progression 46 during traversal of the surface to be treated, which is limited by the contour edges of the area to be treated. Variation of the track width 42, the selected distance 43 between the lines 50, the number of passes and the traversed direction all make it possible to take into account special features of the material to be removed, and influence the stripping result. The laser beam may be adjusted to last about 100-150 nanoseconds such that it takes about one second to treat a 15 $mm^2$ surface.

Figure 6:
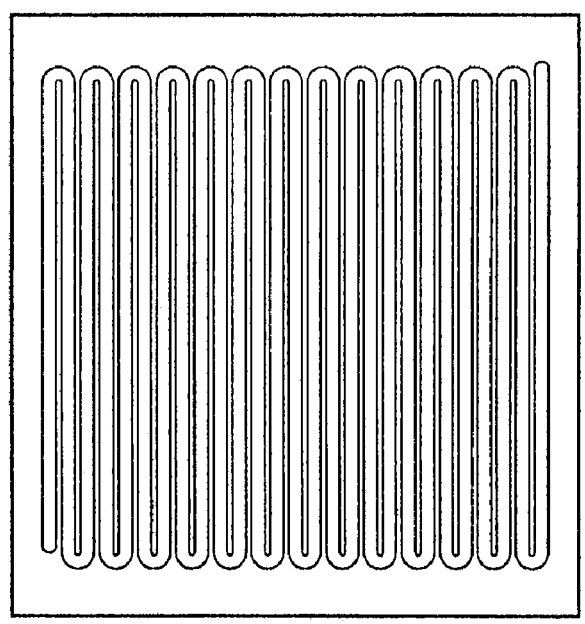
FIGS. 6 and 7 show cleaned surfaces given a large and small track spacing of a laser beam guided over a surface.

FIG. 6 shows a cleaned surface given a large track distance 42 of a laser beam guided over a surface. The figure shows a quadratic area, which clearly shows the track progression. This is because the track distance 42 selected exceeded the diameter of an arc spot 44. As a result, a material residue 52 arises between the individual tracks of the arc spots. The stripping process has failed, in this example, to completely remove the coating.

Figure 7:
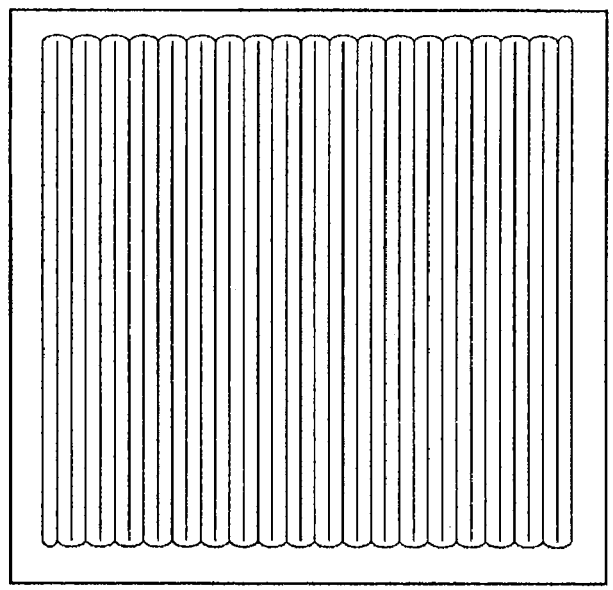

FIG. 7 shows a cleaned surface given a small track distance 42 of a laser beam guided over a surface. As in FIG. 6, a quadratic area is visible, in which the laser beam 28 was used. Selecting a suitable track distance 42 essentially resulted in the removal of all undesired layers on the cleaned surface. The drawing in FIG. 7 is an intensively cleaned surface. The term intensively cleaned means that the resulting surface has the desired properties, such as conductivity, over the entire surface.

Figure 8:
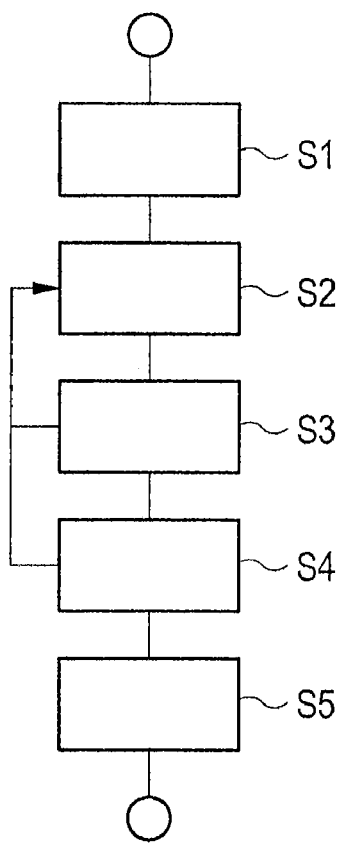
FIG. 8 shows a flowchart of a method for removing a surface coating in an area to be stripped on a surface according to this invention.

FIG. 8 shows a flowchart of a method for removing a surface coating in an area to be stripped on a surface according to this invention. As shown on the flowchart, the wavelength of the laser beam 28 is first adjusted to the absorption behavior of a surface coating in an adjusting step S1 to prevent damage to the basic material. As a result of this adjustment, the desired detachment process can be made to only loosen the surface coating from the surface. The laser beam 28 is then aligned relative to the area to be cleaned in a positioning and alignment step S2. As soon as the desired position has been reached, a short pulse of the laser beam 28 is generated in a laser pulsing step S3. This pulse conveys the energy from the laser beam 28 to the arc spot 44 being covered by the laser beam 28 at the time. If the area of the arc spot 44 has contaminants that can absorb the energy supplied by the laser beam 28, the surface coating evaporates as shown in an evaporating step S4. The process of aligning the laser beam, pulsing and evaporating is repeated until the entire area to be treated has been traversed. The evaporated surface coating that dissolves into the atmosphere can then be extracted as depicted in an suction cleaning step S5, for example.

In addition, it must be noted that "comprising" does not exclude any other elements or steps, and that "one" or "an" does not preclude a plurality. Further, let it be noted that features or steps that were described drawing reference to one of the above exemplary embodiments can be used in combination with other features or steps of other exemplary embodiments described above.

The invention claimed is:

1. A method for removing a surface coating of a terminal surface area on an aircraft structural component surface using a laser beam, the method comprising the steps of:
   positioning and aligning the laser beam on the area to be cleaned;
   pulsing the laser beam;
   removing the surface coating from the terminal surface area by repeating the steps of positioning and pulsing such that the terminal surface area is electrically conductive over the entire terminal surface area and a sharp transition is defined between the terminal surface area and the surface coating remaining on the aircraft structural component; and
   making an electrical ground connection at the terminal surface area of the aircraft structural component, wherein the step of removing is limited to contour edges of a terminal shoe, and the step of making fastens the terminal shoe over the terminal surface area such that the contour edges of the terminal shoe are aligned with the sharp transition.

2. The method of claim 1, further comprising the step of: applying an Nd:YAG laser for generating the laser beam.

3. The method of claim 1, further comprising the step of: applying a TEA $CO_2$ laser for generating the laser beam.

4. The method of claim 1, further comprising the step of: evaporating the surface coating.

5. The method of claim 4, further comprising the step of: performing a suction cleaning of the evaporated surface coating.

6. The method of claim 1, further comprising the step of: adjusting a wavelength of the laser beam to an absorption behavior of the surface coating.

7. The method of claim 6, further comprising: confining the effect of the laser beam to the surface coating.

8. The method of claim 6, wherein the step of adjusting the wavelength includes selecting the wavelength of the laser beam to substantially reflect from a surface disposed beneath the surface coating.

9. The method of claim 8, wherein the surface coating is a layer selected from the following group consisting of an anodizing layer, a primer layer, and a top coat layer; wherein the anodizing layer is based on chromic acid or sulfuric acid; and wherein the top coat layer is based on at least one of polyurethane, epoxide or powdered lacquer.

10. The method of claim 9, further comprising: confining the effect of the laser beam to the surface coating.

11. The method of claim 1, wherein the step of pulsing limits a length of each pulse to a range from 100 to not greater than 150 nanoseconds, and the steps of positioning and pulsing are repeated such that 15 square millimeters of the surface coating are removed per second in the step of removing.

* * * * *